United States Patent
Ohshita et al.

(10) Patent No.: US 6,482,546 B1
(45) Date of Patent: Nov. 19, 2002

(54) RECHARGEABLE LITHIUM BATTERY

(75) Inventors: Ryuji Ohshita, Neyagawa (JP); Nobumichi Nishida, Tokushima (JP); Hiroshi Watanabe, Sumoto (JP); Shin Fujitani, Hirakata (JP)

(73) Assignee: Sanyo Electric Co., Ltd., Moriguchi (JP)

(*) Notice: Subject to any disclaimer, the term of this patent is extended or adjusted under 35 U.S.C. 154(b) by 0 days.

(21) Appl. No.: 09/526,375

(22) Filed: Mar. 16, 2000

(30) Foreign Application Priority Data

Mar. 19, 1999 (JP) ............................................. 11-074769

(51) Int. Cl.[7] .............................. H01M 4/58; H01M 4/50
(52) U.S. Cl. ................................ 429/231.1; 429/231.4; 429/218; 429/218.1; 429/224
(58) Field of Search ........................... 429/231.1, 231.4, 429/231.8, 218, 218.1, 224; 29/623.1–623.5; 423/593–599

(56) References Cited

U.S. PATENT DOCUMENTS

| | | | |
|---|---|---|---|
| 4,952,545 A | * 8/1990 | Imanari et al. | ................. 502/73 |
| 5,342,712 A | * 8/1994 | Mieczkowska et al. | ...... 429/224 |
| 5,378,560 A | * 1/1995 | Tomiyama | ................... 429/217 |
| 5,397,806 A | * 3/1995 | Soled et al. | ................. 518/715 |
| 5,478,673 A | * 12/1995 | Funatsu | ..................... 429/231.2 |
| 5,478,674 A | * 12/1995 | Miyasaka | .................... 429/223 |
| 5,478,675 A | * 12/1995 | Nagaura | ...................... 429/224 |
| 5,545,468 A | 8/1996 | Koshiba et al. | |
| 5,571,637 A | * 11/1996 | Idota | ............................ 429/218 |
| 5,654,114 A | * 8/1997 | Kubota et al. | ............. 429/231.3 |
| 5,916,707 A | * 6/1999 | Omaru et al. | ................. 429/163 |
| 5,919,588 A | * 7/1999 | Jose et al. | .................... 429/206 |
| 5,928,714 A | * 7/1999 | Nunome et al. | ............ 29/623.5 |
| 6,103,421 A | * 8/2000 | Torata et al. | ................. 423/140 |
| 6,221,531 B1 | * 4/2001 | Vaughey et al. | ............. 423/592 |
| 6,337,160 B1 | * 1/2002 | Hilarius et al. | .............. 252/500 |
| 6,350,543 B2 | * 2/2002 | Yang et al. | ................... 429/224 |
| 6,372,384 B1 | * 4/2002 | Fujimoto et al. | ......... 429/231.1 |

FOREIGN PATENT DOCUMENTS

| | | | | |
|---|---|---|---|---|
| EP | 0511632 A1 | * 11/1992 | ............... | 429/231.1 |
| JP | 57011476 | 1/1982 | | |
| JP | 06275263 | 9/1994 | | |
| JP | 7-302587 | * 11/1995 | ............... | 429/231.1 |
| JP | 8-17423 | * 1/1996 | ............... | 429/231.1 |
| JP | 8-180875 | * 7/1996 | ............... | 429/231.1 |

OTHER PUBLICATIONS

"Anatase as a Cathode Material in Lithium-Organic Electrolyte Rechargeable Batteries"; by F. Bonino et al., J.Power Sources., vol. 6, pp. 261–270; 1981.

"Why transition metal (di) oxides are the most attractive materials for batteries", by Ohzuku et al., Solid State Ionics, 69:201, 1994, pp. 201–211.

Binary phase diagrams for Vo, MnO, FeO, CoO, NiO, MoO, in "Binary Alloy Phase Diagrams", American Society for Metals, 1986.

* cited by examiner

Primary Examiner—M. Alexandra Elve
Assistant Examiner—L. Edmondson
(74) Attorney, Agent, or Firm—W. F. Fasse; W. G. Fasse

(57) ABSTRACT

A rechargeable lithium battery has a positive electrode, a negative electrode and a non-aqueous electrolyte. The positive or negative electrode contains, as its active material, a complex oxide comprising a material represented by the compositional formula $M_xTi_{1-x}O_2$ and including an anatase-form crystal structure phase, wherein M is at least one metallic element selected from V, Mn, Fe, Co, Ni, Mo and Ir and x satisfies the relationship $0<x\leq0.11$. Lithium may further be added to the complex oxide.

21 Claims, 1 Drawing Sheet

RECHARGEABLE LITHIUM BATTERY

BACKGROUND OF THE INVENTION

1. Field of the Invention

The present invention relates to a rechargeable lithium battery, and more particularly to a rechargeable lithium battery which utilizes the improved active material for its positive or negative electrode.

2. Description of Related Art

In recent years, rechargeable lithium batteries have been extensively developed. The performance characteristics of rechargeable batteries, such as charge-discharge voltages, charge-discharge cycle life characteristics and storage capabilities, depend largely on the particular electrode active material used. This has led to the search of various active materials.

The use of titanium oxides for the active material has been investigated. Among them, spinel-phase $Li(Li_{1/3}Ti_{5/3})O_4$, because of its reduced tendency to be strained during charge and discharge, has been proposed as an active material capable of providing excellent cycle life performance (See for example, T. Ohzuku, Solid State Ionics, 69:201, 1994). Another titanium oxide known as exhibiting charge-discharge activity is anatase-form titanium oxide and its use as an active material has been investigated for years (See, for example F. Bonino, J. Power Sources., 6:261, 1981). It is known that the theoretical capacity is 174 mAh/g for the spinel-phase $Li(Li_{1/3}Ti_{5/3})O_4$ active material and 335 mAh/g for the anatase-form titanium oxide active material. It is also known that the theoretical capacity of anatase-form titanium oxide is greater than that of $LiTiO_2$, 308 mAh/g.

However, the anatase-form titanium oxide shows a tendency to become inactive after repetitive charge-discharge cycling, leading to the reduction of battery voltage (See, for example, F. Bonino, J. Power Sources., 6:261, 1981).

Japanese Patent Laying-Open No. Hei 6-275263 (1994) discloses that the use of lithium titanate, as prepared by heat treating a combination of titanium oxide and a lithium compound, for negative active material of rechargeable lithium batteries results in the improvement of cycle characteristics. However, lithium titanate exhibits a reduced capacity per gram of active material, compared to the anatase-form titanium oxide, which has been a problem.

There accordingly has been a need for the active material which can yield high charge capacity, comparable to that of anatase-form titanium oxide, undergo little strain during charge and discharge and impart excellent charge-discharge cycle characteristics.

SUMMARY OF THE INVENTION

The present invention has been made to satisfy the aforementioned need and its object is to provide a rechargeable lithium battery which exhibits a high capacity and excellent charge-discharge cycle characteristics.

The rechargeable lithium battery of the present invention has a positive electrode, a negative electrode and a non-aqueous electrolyte. Characteristically, the positive or negative electrode contains, as active material, complex oxide represented by the compositional formula $M_xTi_{1-x}O_2$ and including an anatase-form crystal structure phase, wherein M is at least one metallic element selected from V, Mn, Fe, Co, Ni, Mo and Ir and x satisfies the relationship $0<x\leq0.11$. The complex oxide may further contain lithium.

In accordance with the present invention, the introduction of the metallic element M (at least one of V, Mn, Fe, Co, Ni, Mo and Ir) into the crystal lattice of anatase-form titanium oxide serves to stabilize the crystal structure of the active material. The use of the complex oxide for the positive or negative electrode thus results in the improvement of charge-discharge cycle characteristics.

Any of the afore-listed metallic elements M is known to form a stable compound with oxygen and also to have a decomposition temperature of not below 700° C. (See, for example, binary phase diagrams for M-O in "Binary Alloy Phase Diagrams", American Society for Metals, 1986). Since any of these metallic elements M tends to be chemically bound to oxygen by a relatively strong force, such a metallic element M is believed to stabilize the crystal structure of anatase-form titanium oxide when it substitutes for a part of Ti present therein and thus occupies certain sites of the crystal lattice.

In the present invention, the stoichiometry x of the metallic element M in the above-specified composition of the complex oxide is maintained not to exceed 0.11. If the inclusion of the metallic element M is excessive, i.e., if x exceeds 0.11, a separate phase composed principally of M may be produced to result in lowering the improving effect of charge-discharge characteristics.

In the present invention, the complex oxide for use as the positive or negative active material includes a phase of anatase-form crystal structure. The presence of anatase-form crystal structure can be identified by X-ray diffraction (XRD).

An electrolyte solvent for use in the rechargeable lithium battery according to the present invention can be selected from non-aqueous electrolyte solvents generally used for rechargeable lithium batteries. Specifically, it may be a mixed solvent of cyclic carbonate and chain carbonate, for example. Examples of cyclic carbonates include ethylene carbonate, propylene carbonate and butylene carbonate. Examples of chain carbonates include dimethyl carbonate, methyl ethyl carbonate and diethyl carbonate. The electrolyte solvent may alternatively be a combination of the afore stated cyclic carbonate and an ether solvent, for example. Examples of ether solvents include 1,2-dimethoxyethane, 1,2-diethoxyethane and the like. A useful electrolyte solute may be $LiPF_6$, $LiBF_4$, $LiCF_3SO_3$, $LiN(CF_3SO_2)_2$, $LiN(C_2F_5SO_2)_2$, $LiN(CF_3SO_2)(C_4F_9SO_2)$, $LiC(CF_3SO_2)_3$, $LiC(C_2F_5SO_2)_3$ and any combination thereof, for example. Other applicable electrolytes include gelled polymer electrolytes wherein a liquid electrolyte is impregnated in polymers such as polyethylene oxide and polyacrylonitrile, and inorganic solid electrolytes such as LiI and $Li_3N$.

In the present invention, any non-aqueous electrolyte can be used, so long as it contains a lithium compound as a solute for realizing an ionic conductivity and a solvent used to solubilize and hold the solute is hardly decomposed at voltages during battery charge, discharge and storage.

In the case where the aforementioned titanium complex oxide is used for the positive active material, a suitable negative active material may be chosen from carbon materials capable of electrochemical storage and release of Li, such as graphite (either natural or synthetic), coke, and calcined organics; Li alloys such as Li—Al, Li—Mg, Li—In, Li—Al—Mn alloys; and metallic Li. In such instances, a charge voltage of about 3 V and discharge voltage of about 2 V will be given. The contemplated effect of improving cycle life performances becomes more significant when the carbon materials, among those active materials, are used for the negative active material. This is because the carbon materials are contrary in property to the Li alloys and metallic Li which, during charge and discharge, are likely to be accompanied by the growth of treelike dendrites that could cause internal short circuits.

In the case where the aforementioned titanium complex oxide is used for the negative active material, lithium-containing transition metal oxide, such as $LiCoO_2$, $LiNiO_2$, $LiMn_2O_4$, $LiMnO_2$, lithium-containing $MnO_2$, $LiCo_{0.5}Ni_{0.5}O_2$, $LiNi_{0.7}Co_{0.2}Mn_{0.1}O_2$ or the like, may be used as the positive active material. In this instance, a charge voltage of about 2.8–3 V and a discharge voltage of about 1.8–2.0 V will be given. The use of titanium complex oxide including the anatase crystal structure phase for the negative active material thus results in a marked improvement of charge-discharge cycle life characteristics. This is considered due to the increased potential of the negative electrode, relative to that of lithium, lithium alloy or Li—GIC (Li-intercalated graphite), which suppressed the reductive decomposition of the electrolyte solution.

DESCRIPTION OF PREFERRED EXAMPLES

Figure 1:
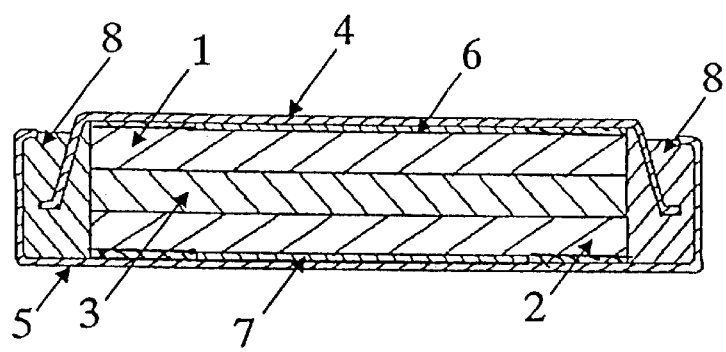
FIG. 1 is a sectional view, illustrating a flat-type rechargeable lithium battery embodiment in accordance with the present invention.

The present invention is now described in more detail with reference to preferred examples. It will be recognized that the following examples merely illustrate the practice of the present invention but are not intended to be limiting thereof. Suitable changes and modifications can be effected without departing from the scope of the present invention.

EXAMPLE 1

Flat-disc type batteries were assembled utilizing natural graphite active material for a negative electrode, and the active material of the present invention, i.e., the complex oxide of the formula $O_{0.05}Ti_{0.95}O_2$ (M is V, Mn, Fe, Co, Ni, Mo or Ir) for a positive electrode. Each battery was measured for charge-discharge cycle life. Example 1 was conducted to investigate how the type of introduced metallic element M affected the charge-discharge cycle life.

(A) Positive Electrode Preparation $H_2TiO_3$, as a starting material, and vanadium (III) oxide ($V_2O_3$) were respectively weighed such that a ratio of numbers of V and Ti atoms was brought to 5:95, and then mixed in a mortar. The mixture was pressed in a 17 mm-diameter mold at a pressure of 115 $kg/cm^2$ into a shape, and then calcined under air-flow atmosphere at 700° C. for 10 hours to obtain a calcined product of the compositional formula $V_{0.05}Ti_{0.95}O_2$. This calcined product was subsequently crushed in a mortar into particles with an average particle size of 10 $\mu$m.

85 parts by weight of the $V_{0.05}Ti_{0.95}O_2$ powder, 10 parts by weight of carbon powder as an electrical conductor, and 5 parts by weight of poly(vinylidene fluoride) powder as a binder were mixed. By adding this mixture to a N-methyl-2-pyrrolidone (NMP) solution, a slurry was formed.

The slurry was applied by a doctor blade technique onto one surface of a 20 $\mu$m thick aluminum current collector to form an active material layer thereon. The current collector carrying the active material layer thereon was dried at 150° C. and then punched to remove therefrom a disc-form positive electrode having a diameter of 10 mm and a thickness of about 80 $\mu$m.

(B) Li Insertion Into Positive Electrode $LiPF_6$ was dissolved in a mixed solvent consisting of equivolume of ethylene carbonate and diethyl carbonate to a concentration of 1 mole/l to obtain an electrolyte solution. The above-prepared positive electrode, metallic Li and a microporous polypropylene membrane placed therebetween were immersed in the electrolyte solution, and then subjected to electrolysis at a constant current of 100 $\mu$A to 1.5 V versus $Li/Li^+$, so that Li was inserted into the positive electrode. This Li-inserted positive electrode was used in the following battery assembly (E).

(C) Negative Electrode Preparation 95 parts by weight of natural graphite powder and 5 parts by weight of poly(vinylidene fluoride) powder were mixed. A slurry was formed by adding this mixture to an NMP solution. This slurry was applied by a doctor blade technique onto one surface of a 20 $\mu$m thick copper current collector to form an active material layer thereon. The current collector carrying the active material layer thereon was dried at 150° C. and then punched to remove therefrom a disc-form negative electrode having a diameter of 10 mm and a thickness of about 60 $\mu$m. The negative electrode thus prepared was used in the following battery assembly (E)

(D) Electrolyte Preparation $LiPF_6$ was dissolved in a mixed solvent consisting of equivolume of ethylene carbonate and diethyl carbonate to a concentration of 1 mole/l to obtain an electrolyte solution. This electrolyte solution was used in the subsequent battery assembly (E).

(E) Battery Assembly

By utilizing the positive electrode, negative electrode and electrolyte solution respectively prepared in (B), (C) and (D), a flat-type rechargeable lithium battery A-1 of Example 1, shown in FIG. 1, was assembled. FIG. 1 is a schematic sectional view, showing a rechargeable lithium battery construction of Example 1 as assembled in accordance with the present invention. As shown in FIG. 1, the positive electrode 1 and negative electrode 2 are disposed on opposite sides of a separator 3 comprised of a microporous polypropylene membrane. The positive electrode 1, negative electrode 2 and separator 3 are accommodated in a battery case defined by a positive can 4 and a negative can 5. The positive electrode 1 is electrically coupled to the positive can 4 by a positive current collector 6. The negative electrode 2 is electrically coupled to the negative can 5 by a negative current collector 7. An insulating polypropylene gasket 8 physically separates the respective peripheries of the positive can 4 and the negative can 5 to prevent short-circuiting thereof. Such arrangements lead to the construction of a rechargeable lithium battery.

In order to investigate how the type of metallic element M affects the charge-discharge cycle life of a resulting battery, other rechargeable lithium batteries A-2 through A-7 of Example 1 were assembled by following the above-described procedures, with the exception that vanadium (III) oxide, as the starting material used in the procedure (A), was changed to an oxide of Mn, Fe, Co, Ni, Mo or Ir.

COMPARATIVE EXAMPLE 1

The procedure of Example 1 was followed, except that anatase $TiO_2$ was used as the positive active material, to assemble a flat-disc type battery B-1 of Comparative Example 1.

Another flat-disc type battery B-2 of Comparative Example 1 was further assembled by following the procedure of Example 1 with the exception that lithium titanate (active material disclosed in Japanese Patent Laying-Open No. Hei 6-275263) prepared by heat treating a combination of anatase $TiO_2$ and LiOH at 700° C. was used as the positive active material.

(F) Charge-Discharge Cycle Life Characteristics

Each battery was charged at a current of 100 μA at 25° C. to 3.0 V and then discharged at a current of 100 μA to 1.5 V. This unit cycle was repeated and a capacity retention (%) was determined by a ratio of a $50^{th}$-cycle discharge capacity to a 1st-cycle discharge capacity. The results are given in Table 1.

For the batteries A-1 through A-7 of Example 1, an average discharge voltage was about 1.6 V and an initial capacity was 3.50–3.54 mAh. For the batteries B-1 and B-2 of Comparative Example 1, their discharge voltages were 1.6 V and 1.0 V, respectively, and their initial capacities were 3.39 mAh and 1.94 mAh, respectively.

TABLE 1

| Designation of Battery | Positive Active Material | Initial Capacity of Positive Active Material (mAh/g) | Negative Active Material | Capacity Retention (%) |
|---|---|---|---|---|
| A 1 | $V_{0.05}Ti_{0.95}O_2$ | 221 | Graphite | 90 |
| A 2 | $Mn_{0.05}Ti_{0.95}O_2$ | 219 | Graphite | 88 |
| A 3 | $Fe_{0.05}Ti_{0.95}O_2$ | 221 | Graphite | 92 |
| A 4 | $Co_{0.05}Ti_{0.95}O_2$ | 221 | Graphite | 89 |
| A 5 | $Ni_{0.05}Ti_{0.95}O_2$ | 220 | Graphite | 91 |
| A 6 | $Mo_{0.05}Ti_{0.95}O_2$ | 220 | Graphite | 91 |
| A 7 | $Ir_{0.05}Ti_{0.95}O_2$ | 219 | Graphite | 90 |
| B 1 | $TiO_2$ (Anatase) | 212 | Graphite | 30 |
| B 2 | $TiO_2$ (Anatase), Heat Treated with LiOH at 700° C. | 121 | Graphite | 85 |

As apparent from Table 1, the batteries A-1 through A-7 in accordance with the present invention exhibit the increased capacity retention values, compared to the battery B-1 of Comparative Example. This demonstrates their superior charge-discharge cycle life characteristics. Also, the batteries A-1 through A-7 exhibit the increased initial capacity values, compared to the battery B-2 of Comparative Example.

EXAMPLE 2

Flat-disc type batteries A-8 and A-9 of Example 2 were assembled utilizing $V_{0.05}Ti_{0.95}O_2$ for their positive active material and metallic lithium and Li—Al alloy (20.6 parts by weight of Li and 79.4 parts by weight of Al) for their respective negative active materials. Each battery was measured for charge-discharge cycle life.

The procedures (A), (D) and (E) as employed in Example 1 were followed to prepare the positive electrode and electrolyte solution and assemble batteries. The procedure (B) used in Example 1 for insertion of lithium into the positive electrode was not carried out in Example 2. The negative electrode was prepared according to the following procedure.

(C') Negative Electrode Preparation

A sheet composed of metallic Li or Li—Al alloy was punched under argon atmosphere to remove therefrom a disc-form negative electrode having a diameter of 10 mm and a thickness of 1.0 mm. These negative electrodes were used in the battery assembly.

COMPARATIVE EXAMPLE 2

The procedure of Example 2 was followed, except that anatase $TiO_2$ was used as the positive active material, to assemble flat-disc type batteries B-3 and B-4 of Comparative Example 2.

(F') Charge-Discharge Cycle Life Characteristics

Each battery was discharged at a current of 100 μA at 25° C. to 1.5 V. Subsequently, the battery was charged at a current of 100 μA to 3.0 V and then discharged at a current of 100 μA to 1.5 V, which was recorded as a 1st cycle.

Thereafter, a unit cycle consisted of the charging at a current of 100 VA to 3.0 V and the subsequent discharging at a current of 100 VA to 1.5 V. This unit cycle was repeated and a capacity retention (%) was determined by a ratio of a $50^{th}$-cycle discharge capacity to a 1st-cycle discharge capacity. The results are given in Table 2.

An average discharge voltage was 1.7 V for the battery A-8 and 1.3 V for the battery A-9. An initial capacity was 3.54 mAh for both batteries A-8 and A-9. On the other hand, an average discharge voltage was 1.7 V for the comparative battery B-3 and 1.3 V for the comparative battery B-4. An initial capacity was 3.39 mAh for both comparative batteries B-3 and B-4.

TABLE 2

| Designation of Battery | Positive Active Material | Negative Active Material | Capacity Retention (%) |
|---|---|---|---|
| A 8 | $V_{0.05}Ti_{0.95}O_2$ | Li | 75 |
| A 9 | $V_{0.05}Ti_{0.95}O_2$ | Li—Al | 77 |
| B 3 | $TiO_2$ (Anatase) | Li | 24 |
| B 4 | $TiO_2$ (Anatase) | Li—Al | 26 |

As apparent from the results shown in Table 2, the batteries A-8 and A-9 in accordance with the present invention exhibit the increased capacity retention values, compared to the comparative batteries B-3 and B-4. This demonstrates their superior charge-discharge cycle life characteristics.

As can be appreciated from the comparison of the results shown in Table 1 to those shown in Table 2, the batteries A-1 through A-7 incorporating the graphite negative active material exhibit the increased capacity retention values, compared to the batteries A-8 and A-9. This is probably because the carbon material, when used as the negative active material, is contrary in property to metallic Li and Li alloys which, during charge and discharge, are accompanied by the growth of treelike dendrites that could cause internal short circuits.

EXAMPLE 3

Flat-disc type batteries A-10 through A-12 of Example 3 were assembled utilizing $V_{0.05}Ti_{0.95}O_2$ for their negative active material and lithium-containing transition metal compounds, i.e. $LiCoO_2$, $LiNiO_2$ and $LiMn_2O_4$ (See, for example, T. Ohzuku et al., Solid State Ionics, 69, p.201 (1994)) for their respective positive active materials. Each battery was measured for charge-discharge cycle life.

The procedure (A) used in Example 1 for preparation of positive electrode was followed, except that the current collector material was changed from Al to Cu, to obtain a negative electrode incorporating $V_{0.05}Ti_{0.95}O_2$ as the negative active material. The procedures (D) and (E) used in Example 1 were followed to prepare the electrolyte solution and assemble batteries. The procedure (B) used in Example 1 for insertion of lithium into the positive electrode (negative electrode in this case) was not carried out in Example 3. A positive electrode was prepared according to the following procedure.

(A') Positive Electrode Preparation $Li_2CO_3$ and $CoCO_3$, as starting materials, were weighed such that a ratio of numbers of Li and Co atoms was brought to 1:1, and then mixed in a mortar. The mixture was pressed in a 17 mm-diameter mold at a pressure of 115 kg/cm$^2$ into a shape, calcined in the air at 800° C. for 24 hours, and then crushed in a mortar to obtain an $LiCoO_2$ powder having an average particle size of 10 μm for positive active material.

85 parts by weight of the $LiCoO_2$ powder, 10 parts by weight of carbon powder as an electrical conductor, and 5 parts by weight of poly(vinylidene fluoride) powder as a binder were mixed. A slurry was formed by adding this mixture to an N-methyl-2-pyrrolidone (NMP) solution. The slurry was coated by a doctor blade technique onto one surface of a 20 μm thick aluminum current collector to form an active material layer thereon. The current collector carrying the active material layer thereon was dried at 150° C. and then punched to remove therefrom a disc-form positive electrode having a diameter of 10 mm and a thickness of about 80 μm.

Similarly, $LiNO_3$ and NiO, as starting materials, were weighed such that a ratio of numbers of Li and Ni atoms was brought to 1:1, and then mixed in a mortar. The mixture was pressed in a 17 mm-diameter mold at a pressure of 115 kg/cm$^2$ into a shape, calcined under oxygen atmosphere at 700° C. for 48 hours, and then crushed in a mortar to obtain an $LiNiO_2$ powder having an average particle size of 10 μm for positive active material. Thereafter, a slurry was formed using the $LiNiO_2$ powder in the same manner as described above. By using the slurry in the same manner as described above, a positive electrode was prepared which contained $LiNiO_2$ as the active material.

Also similarly, $LiOH.H_2O$ and $MnO_2$, as starting materials, were weighed such that a ratio of numbers of Li and Mn atoms was brought to 1:2, and then mixed in a mortar. The mixture was pressed in a 17 mm-diameter mold at a pressure of 115 kg/cm$^2$ into a shape, calcined in the air at 650° C. for 48 hours, and then crushed in a mortar to obtain an $LiMn_2O_4$ powder having an average particle size of 10 μm. Then, a slurry was formed using the $LiMn_2O_4$ powder in the same manner as described above. By using the slurry in the same manner as described above, a positive electrode was prepared which contained $LiMn_2O_4$ as the active material.

COMPARATIVE EXAMPLE 3

The procedure of Example 3 was followed, except that anatase $TiO_2$ was used as the negative active material, to assemble flat-disc type batteries B-5 through B-7 of Comparative Example 3.

(F') Charge-Discharge Cycle Life Characteristics

Each battery was charged at a current of 100 μA at 25° C. to 2.5 V and then discharged at a current of 100 μA to 0.5 V. This was recorded as a 1st cycle. Thereafter, a unit cycle consisted of the charging at a current of 100 μA to 2.5 V and the subsequent discharging at a current of 100 μA to 0.5 V. This unit cycle was repeated and a capacity retention (%) was determined by a ratio of a 50th-cycle discharge capacity to a 1st-cycle discharge capacity. The results are given in Table 3.

For the batteries A-10, A-11 and A-12, their discharge voltages were 1.8~2.0 V, on average, and their initial capacity was 3.39 mAh.

TABLE 3

| Designation of Battery | Positive Active Material | Negative Active Material | Capacity Retention (%) |
|---|---|---|---|
| A 10 | $LiCoO_2$ | $V_{0.05}Ti_{0.95}O_2$ | 95 |
| A 11 | $LiNiO_2$ | $V_{0.05}Ti_{0.95}O_2$ | 93 |
| A 12 | $LiMn_2O_4$ | $V_{0.05}Ti_{0.95}O_2$ | 93 |
| B 5 | $LiCoO_2$ | $TiO_2$ (Anatase) | 32 |
| B 6 | $LiNiO_2$ | $TiO_2$ (Anatase) | 28 |
| B 7 | $LiMn_2O_4$ | $TiO_2$ (Anatase) | 28 |

As apparent from Table 3, the batteries, when utilizing the anatase-form complex oxide of the present invention for their negative active material and Li-containing transition metal complex oxides for their respective positive electrode materials, exhibit capacity retentions of 93–95%, i.e., the improved charge-discharge cycle life characteristics compared to comparative batteries B-5 through B-7. Also, the data shown in Table 3 indicate superior results in terms of charge-discharge cycle life characteristics, compared to those data respectively shown in Tables 1 and 2. This is believed to be due to the increased potential of the negative electrode relative to those of metallic Li, Li alloys and lithium-intercalated carbon, which suppressed the reductive decomposition of the electrolyte solution.

EXAMPLE 4 AND COMPARATIVE EXAMPLE 4

In Example 4 and Comparative Example 4, flat-disc type batteries were assembled utilizing the anatase-form complex oxide of the present invention, $V_xTi_{1-x}O_2$, for the positive active material and natural graphite for the negative active material, wherein the stoichiometry x of vanadium was varied to investigate its effect on charge-discharge cycle lives of resulting batteries. The procedure of Example 1 was followed, except that the ratio of numbers of V and Ti atoms was varied, to prepare $V_{0.02}Ti_{0.98}O_2$, $V_{0.03}Ti_{0.97}O_2$, $V_{0.07}Ti_{0.93}O_2$, $V_{0.08}Ti_{0.92}O_2$ and $V_{0.01}Ti_{0.9}O_2$ as active materials. The flat-disc type batteries A-13 through A-17 of Example 4 were assembled utilizing these for their respective positive active materials and natural graphite for their negative active material. Also, $V_{0.12}Ti_{0.88}O_2$ was prepared by further changing the ratio of number of V and Ti atoms and the flat-disc type battery B-8 of Comparative Example 4 was assembled using such prepared substance as the positive active material.

Those batteries were measured for capacity retention in the same manner as in Example 1. The results are given in FIG. 2. Those batteries exhibited an average discharge voltage of 1.6 V and initial capacities of 3.39–3.54 mAh.

Figure 2:
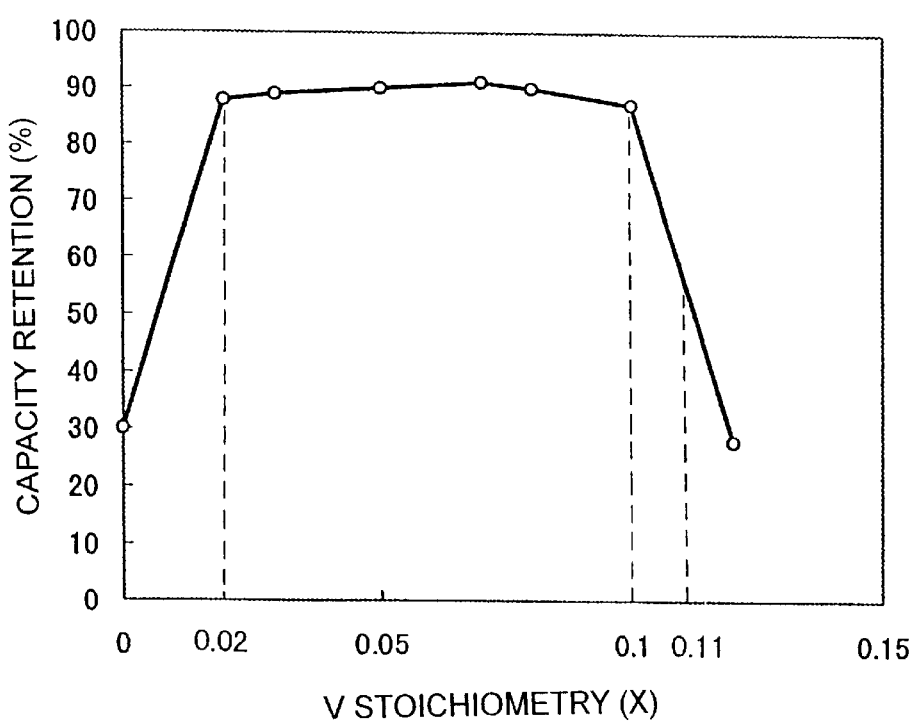
FIG. 2 is a graph showing the relationship between the V stoichiometry x in the composition $V_xTi_{1-x}O_2$ and the capacity retention of the battery incorporating the $V_xTi_{1-x}O_2$ active material.

In FIG. 2, the results for the battery A-1 using $V_{0.05}Ti_{0.95}O_2$ active material and for the comparative battery B-1 using anatase $TiO_2$ active material are also shown.

As can be seen from the results shown in FIG. 2, the batteries exhibited good capacity retention values of higher than 30% when the V stoichiometry x in the formula $V_xTi_{1-x}O_2$ was in the range $0<x\leq0.11$. Particularly for $0.02\leq x\leq0.1$, the batteries exhibited excellent cycle life performances, i.e., capacity retention values of 87–91%.

This is considered to demonstrate that, when the stoichiometry x is maintained not to exceed 0.11, the metallic element V is held in the crystal lattice, without the production of simple substance or oxide phase of vanadium, to result in better stabilizing the crystal structure.

The rechargeable lithium battery of the present invention utilizes a novel complex oxide containing the anatase crystal structure phase for active material of a positive or negative electrode. The use of such a complex oxide active material leads to the rechargeable lithium battery capable of high discharge capacity and excellent charge-discharge cycle life performance characteristics.

The electrode active material of the present invention, when used for rechargeable lithium batteries, can impart the increased discharge capacity and excellent charge-discharge cycle life characteristics thereto.

What is claimed is:

1. A rechargeable lithium battery having a positive electrode, a negative electrode and a non-aqueous electrolyte; said positive electrode containing, as its active material, a complex oxide represented by the compositional formula $M_xTi_{1-x}O_2$ and including an anatase-form crystal structure phase, wherein M is at least one metallic element selected from V, Mn, Fe, Co, Ni, Mo and Ir and x satisfies the relationship $0<x\leq0.11$.

2. The rechargeable lithium battery of claim 1, wherein lithium is further added to said complex oxide.

3. The rechargeable lithium battery of claim 1, wherein said negative electrode contains, as its active material, lithium-containing carbon material.

4. The rechargeable lithium battery of claim 2, wherein said negative electrode contains, as its active material, lithium-free carbon material.

5. A rechargeable lithium battery having a positive electrode, a negative electrode and a non-aqueous electrolyte; said negative electrode containing, as its active material, a complex oxide represented by the compositional formula $M_xTi_{1-x}O_2$ and including an anatase-form crystal structure phase, wherein M is at least one metallic element selected from V, Mn, Fe, Co, Ni, Mo and Ir and x satisfies the relationship $0<x\leq0.11$.

6. The rechargeable lithium battery of claim 5, wherein lithium is further added to said complex oxide.

7. The rechargeable lithium battery of claim 5, wherein said positive electrode contains, as its active material, comprises lithium-containing transition metal oxide.

8. The rechargeable lithium battery of claim 6, wherein said positive electrode contains, as its active material, lithium-free transition metal oxide.

9. An electrode active material, for use in rechargeable lithium batteries, comprising a complex oxide represented by the compositional formula $M_xTi_{1-x}O_2$ and including an anatase-form crystal structure phase, wherein M is at least one metallic element selected from V, Mn, Fe, Co, Ni, Mo and Ir and x satisfies the relationship $0<x\leq0.11$.

10. The electrode active material of claim 9, further comprising lithium added to said complex oxide.

11. A positive active material comprising the electrode active material of claim 9.

12. A negative active material comprising the electrode active material of claim 9.

13. A positive active material comprising the electrode active material of claim 10.

14. A negative active material comprising the electrode active material of claim 10.

15. A rechargeable lithium battery having a positive electrode, a negative electrode and a non-aqueous electrolyte; wherein a first one of said electrodes contains a first active material comprising a complex oxide that comprises a material represented by the compositional formula $M_xTi_{1-x}O_2$ and that includes an anatase-form crystal structure phase, wherein M is at least one metallic element selected from V, Mn, Fe, Co, Ni, Mo and Ir and x satisfies the relationship $0<x\leq0.11$.

16. The rechargeable lithium battery of claim 15, wherein said complex oxide further comprises lithium.

17. The rechargeable lithium battery of claim 15, wherein said first one of said electrodes is said positive electrode, and said negative electrode contains a second active material comprising a lithium-containing carbon material.

18. The rechargeable lithium battery of claim 15, wherein said first one of said electrodes is said positive electrode, and said negative electrode contains a second active material comprising a lithium-free carbon material.

19. The rechargeable lithium battery of claim 15, wherein said first one of said electrodes is said negative electrode, and said positive electrode contains a second active material comprising a lithium-containing transition metal oxide.

20. The rechargeable lithium battery of claim 15, wherein said first one of said electrodes is said negative electrode, and said positive electrode contains a second active material comprising a lithium-free transition metal oxide.

21. The rechargeable lithium battery of claim 15, wherein x in said compositional formula satisfies the relationship $0.02\leq x\leq0.1$.

* * * * *

UNITED STATES PATENT AND TRADEMARK OFFICE
CERTIFICATE OF CORRECTION

PATENT NO. : 6,482,546 B1
DATED : November 19, 2002
INVENTOR(S) : Ohshita et al.

It is certified that error appears in the above-identified patent and that said Letters Patent is hereby corrected as shown below:

Column 3,
Line 42, after "formula", replace "$O_{0.05}Ti_{0.9}O_2$" by -- $M_{0.05}Ti_{0.9}O_2$ --.

Column 6,
Lines 12 and 13, after "100", replace "VA" by -- $\mu A$ --.

Column 7,
Line 36, after "Similarly,", replace "$LiOH.H_2O$" by -- $LiOH \cdot H_2O$ --;
Line 55, before "Charge-Discharge", replace "(F')" by -- (F") --.

Column 8,
Line 38, after "and", replace "$V_{0.01}Ti_{0.9}O_2$" by -- $V_{0.1}Ti_{0.9}O_2$ --.

Signed and Sealed this

First Day of April, 2003

JAMES E. ROGAN
*Director of the United States Patent and Trademark Office*